(12) United States Patent
Rudolf et al.

(10) Patent No.: US 7,040,713 B2
(45) Date of Patent: May 9, 2006

(54) ATTACHMENT DEVICE FOR AN AUXILIARY WHEEL RELEASABLY ATTACHABLE TO A WHEEL OF A VEHICLE

(75) Inventors: Schaad Rudolf, Deitingen (CH); Schaad Fritz Johann, Subingen (CH)

(73) Assignee: Gebr. Schaad AG Raderfabrik, Subingen (CH)

( * ) Notice: Subject to any disclaimer, the term of this patent is extended or adjusted under 35 U.S.C. 154(b) by 17 days.

(21) Appl. No.: 10/721,120

(22) Filed: Nov. 24, 2003

(65) Prior Publication Data

US 2004/0119329 A1 Jun. 24, 2004

(30) Foreign Application Priority Data

Nov. 26, 2002 (EP) .................................. 02406026

(51) Int. Cl.
*B60B 11/00* (2006.01)
(52) U.S. Cl. ..................... 301/39.1; 301/36.1; 301/40.2
(58) Field of Classification Search ............... 301/38.1, 301/39.1, 40.1, 40.2, 40.3, 41.1, 36.1
See application file for complete search history.

(56) References Cited

U.S. PATENT DOCUMENTS

| | | | | | |
|---|---|---|---|---|---|
| 2,231,796 | A | * | 2/1941 | Brown | ..................... 301/35.61 |
| 2,244,083 | A | * | 6/1941 | Richter | ..................... 301/35.61 |
| 2,466,794 | A | * | 4/1949 | Craig | ..................... 301/38.1 |
| 2,632,675 | A | * | 3/1953 | Richard | ..................... 301/35.61 |
| 3,345,110 | A | * | 10/1967 | Cumberland | ..................... 301/35.61 |
| 3,365,236 | A | * | 1/1968 | Snedeker | ..................... 301/35.61 |
| 6,068,346 | A | * | 5/2000 | Pender | ..................... 301/40.6 |

FOREIGN PATENT DOCUMENTS

| | | | |
|---|---|---|---|
| DE | 814 352 | | 9/1951 |
| DE | 1 024 737 | | 2/1958 |
| DE | 1 296 030 | | 5/1969 |
| DE | G 84 34 085.1 | | 3/1986 |
| FR | 2556656 | * | 6/1985 |
| FR | 2 719 808 | | 11/1995 |
| JP | 63-134301 | * | 6/1988 |

\* cited by examiner

*Primary Examiner*—Russell D. Stormer
(74) *Attorney, Agent, or Firm*—Dann, Dorfman, Herrell and Skillman; Henry H. Skillman

(57) ABSTRACT

For fastening an auxiliary wheel to the wheel of a vehicle, bolts are fixed to the auxiliary wheel, which bolts are aligned substantially parallel to the wheel axle of the auxiliary wheel. Each of the bolts has a head which can be inserted into slot-shaped recesses provided on the wheel of the vehicle and can be pushed into the slot-shaped recesses. The head of the bolts is hereby held in the slot-shaped recesses. The auxiliary wheel is locked in this position through locking apparatus. A simple mounting and dismounting of an auxiliary wheel to the wheel of a vehicle is thereby obtained.

9 Claims, 5 Drawing Sheets

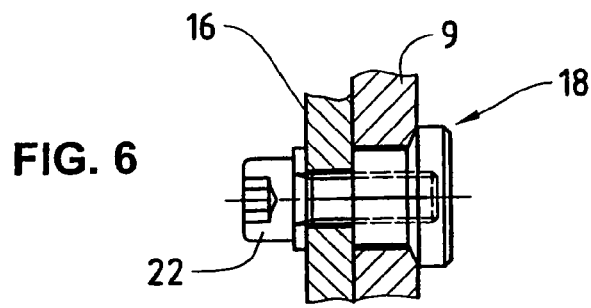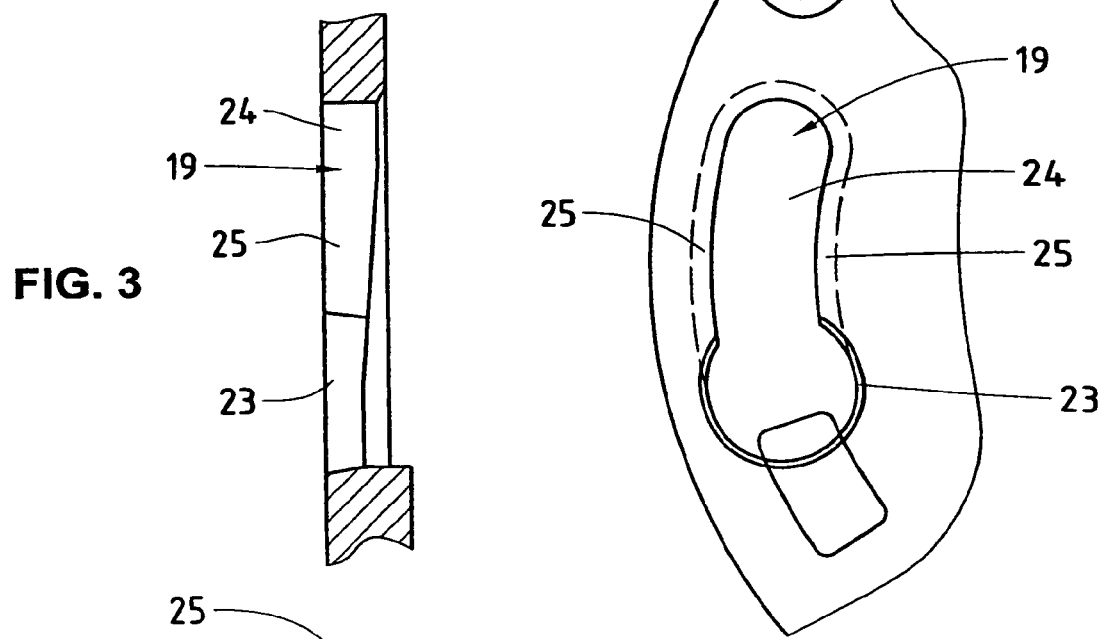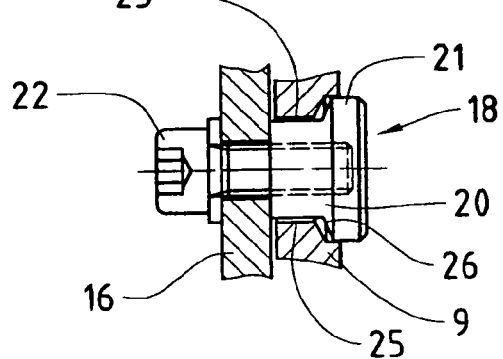

ATTACHMENT DEVICE FOR AN AUXILIARY WHEEL RELEASABLY ATTACHABLE TO A WHEEL OF A VEHICLE

This invention relates to an attachment device for an auxiliary wheel, releasably attachable to a wheel of a vehicle, comprising a coupling part, provided on the auxiliary wheel, with coupling members held therein, and a holding part, provided on the wheel of the vehicle, with corresponding receiving parts for the coupling members, which coupling members are engaged and held in the receiving parts in the attached state of the auxiliary wheel on the wheel of the vehicle, in which state the auxiliary wheel is aligned coaxially to the wheel of the vehicle.

In particular with agricultural vehicles it is advantageous if the supporting surface of the wheels can be enlarged for tilling the fields in order to keep the soil pressure lower. This is particularly advantageous when the fields are sodden. The enlargement of the supporting surface of the wheels is achieved by an auxiliary wheel being mounted on each of the wheels of the vehicle.

Attachment devices with which the auxiliary wheels are able to be mounted on the respective wheels are known. These known attachment devices consist of connecting rods whose one end is designed hook-shaped and engages in each case in a ring bolt, which ring bolts are installed distributed about the circumference on the wheel of the vehicle. The other end of the respective connecting rod engages in a hook, able to be tensioned, which is able to be hung in the wheel rim of the auxiliary wheel and which can be firmly tensioned via a tension lever. The auxiliary wheel is hereby tensioned against a distance sleeve, mounted between the two wheels, and with this sleeve is tensioned on the wheel of the vehicle.

Auxiliary wheels of this kind can also be installed on small vehicles, it being easily possible for these auxiliary wheels to be carried by a person. For attaching such an auxiliary wheel to the wheel of a vehicle the known and previously described devices are not suitable since their handling is too complicated.

Therefore the object of the present invention is to create an attachment device for an auxiliary wheel releasably attachable to the wheel of a vehicle, in particular for small vehicles, which device is simple in construction and easy to handle.

This object is achieved according to the invention in that the coupling members are designed as bolts which are aligned substantially parallel to the wheel axle of the auxiliary wheel and are connected to the wheel rim of the auxiliary wheel, each bolt having a head on the end region remote from the wheel rim, and wherein the receiving parts disposed on the holding part are slot-shaped recesses having an insertion zone, into which zone the heads of the respective bolts are insertable through displacement of the auxiliary wheel in wheel axle direction, and a retaining zone with protruding pieces into which zone the heads of the bolts are pushable through movement of the auxiliary wheel in the plane running substantially perpendicular to the wheel axle, are supportable on the protruding pieces, and are maintainable in this position through locking means.

With attachment means of this kind an auxiliary wheel can be attached to the wheel of a small vehicle, for example a Quad, and can be removed again by a person by means of a few simple hand maneuvers, without additional tools being necessary.

The bolts are preferably fixed on a plate which is connected to the wheel rim of the auxiliary wheel via a distance sleeve, the slot-shaped recesses being provided in a further plate which is connected to the wheel rim of the wheel of the vehicle via spacers, and the plate and the further plate abutting one another in the attached state of the auxiliary wheel on the wheel of the vehicle. An optimal attachment of the auxiliary wheel to the wheel of the vehicle is thereby achieved.

Since the protruding pieces, holding the head of the bolts, of the slot-shaped recesses each have a protruding piece thickness that increases from the respective insertion zone toward the end remote from the insertion zone, and the support surfaces of the protruding pieces for the head of the bolts increase from the insertion zone, the advantage is attained that there is sufficient play for attaching the auxiliary wheel on the wheel of the vehicle, and an optimal fit is achieved through movement of the auxiliary wheel with respect to the wheel of the vehicle.

The slot-shaped recesses co-operating with the respective bolts are preferably disposed circularly and centrosymmetrically about the wheel axle center, so that the state of attachment of the auxiliary wheel with respect to the wheel of the vehicle is achievable through simple turning of the auxiliary wheel after inserting the bolts into the slot-shaped recesses.

The auxiliary wheel is preferably provided with guide and centering means which co-operate with corresponding guide surfaces provided on the wheel of the vehicle and by means of which the auxiliary wheel is led in axial direction and is able to be centered during the displacement, for attaching to the wheel of the vehicle. The placement of the auxiliary wheel on the wheel of the vehicle is thereby made easier.

A further preferred feature of the invention consists in the shank of the bolt and the head of the bolt being cylindrical, the face between head and bolt shank being conically inclined (tapered), and the support surfaces of the protruding pieces being correspondingly beveled. This serves the purpose of making the attachment of the auxiliary wheel to the wheel of the vehicle even easier and has the effect that the auxiliary wheel can be maintained free of play on the wheel of the vehicle in attached state.

The locking means preferably comprise in each case an axially displaceable locking bolt which is borne in a guide bush, which guide bush is disposed on the plate provided on the auxiliary wheel in such a way that in the attached state of the auxiliary wheel on the wheel of the vehicle the locking bolt is insertable with the one end region in the corresponding insertion zone of the slot-shaped recess, and a movement of the auxiliary wheel with respect to the wheel of the vehicle is made impossible in this locked state. An optimal locking is thereby achieved without additional apertures having to be made on the plate of the wheel of the vehicle.

Preferably the end region of the locking bolt insertable into the insertion zone is of conical design, and the insertion zone of the slot-shaped recess is correspondingly conically shaped. A locking free of play is thereby achieved.

A further preferred feature of the invention consists in that the other end region of the locking bolt protrudes beyond the guide bush, and a cross bolt is fixed on this protruding area, by means of which the locking bolt is rotatable, and in that this cross bolt is supported on cheeks provided on the upper edge of the guide bush, which cheeks have an incline in the rotational direction of the locking bolt. Achieved with this design is that the locking bolt is able to be pulled out of the respective aperture without great effort.

A spring element is preferably disposed in the guide bush by means of which the locking bolt is able to be forced in the locked-state direction. An automatic engagement of the locking bolt in the respective aperture in mounted state of the auxiliary wheel on the wheel of the vehicle can thereby be achieved, additionally simplifying the handling.

An embodiment of the present invention will be described more closely in the following with reference to the attached drawing:

FIGS. 3 to 6 are detailed views of a bolt in co-operation with the respective slot-shaped recess;

Figure 1:
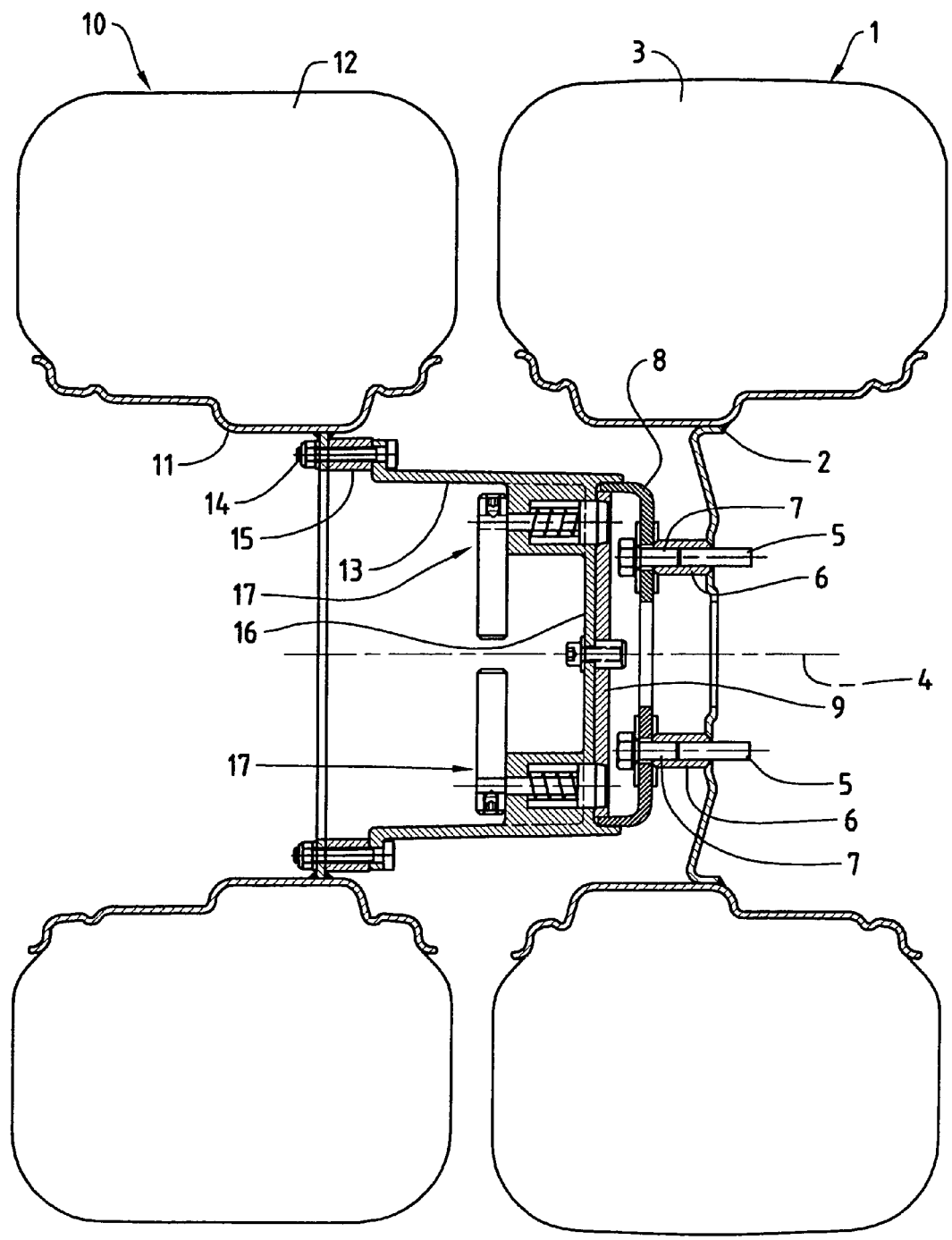
FIG. 1 is a sectional view through a wheel of a vehicle with auxiliary wheel put on and attached.

Shown in section in FIG. 1 is a wheel 1 of a vehicle (not shown). In a known way, this wheel 1 comprises a wheel rim 2, on which a tire 3, filled with air, is held. This wheel 1 is fixed in a known way to the wheel axle 4 (indicated schematically) of the vehicle.

Screwed onto the tire bolts 5 which are fixed to the wheel axle 4 are nuts 6 with which the wheel 1 is fixed to the wheel axle 4 of the vehicle. These nuts 6 have a longer length so that still another bolt 7 can be screwed on in each case. With these bolts 7 a dish 8 is attached to the wheel 1, onto which dish 8 a further plate 9 is screwed that is aligned perpendicular to the wheel axle 4.

Achieved by using nuts 6 having a longer length is that the dish 8 is fixed spaced apart from the wheel rim 2 of the wheel 1, thereby making it possible to use such plates 8 also when the wheel rim 2 has been provided with swellings and ribs for reinforcement.

Placeable on this wheel 1 of the vehicle is an auxiliary wheel 10. This auxiliary wheel 10 likewise comprises a wheel rim 11 on which a tire 12 is likewise put. Screwed onto the wheel rim 11 by means of bolts 14 is a spacer sleeve 13. Between this spacer sleeve 13 and the wheel rim 11 spacer bushes 15 can be put on the bolts 14, whereby, when using the same spacer sleeve 13 in each case with spacer bushes 15 having another length, the spacing of the auxiliary wheel 10 from the wheel 1 can be adjusted.

Installed on the spacer sleeve 13 is a plate 16 aligned perpendicular to the wheel axle 4, this plate 16 and the further plate 9 abutting one another when the auxiliary wheel 10 has been put on the wheel 1 of the vehicle.

As will be described later on, coupling members are provided on the plate 16 which are able to be held in the further plate 9 of the wheel 1. Discernible furthermore in this drawing are locking means 17 which will also be described in detail later on.

Figure 2:
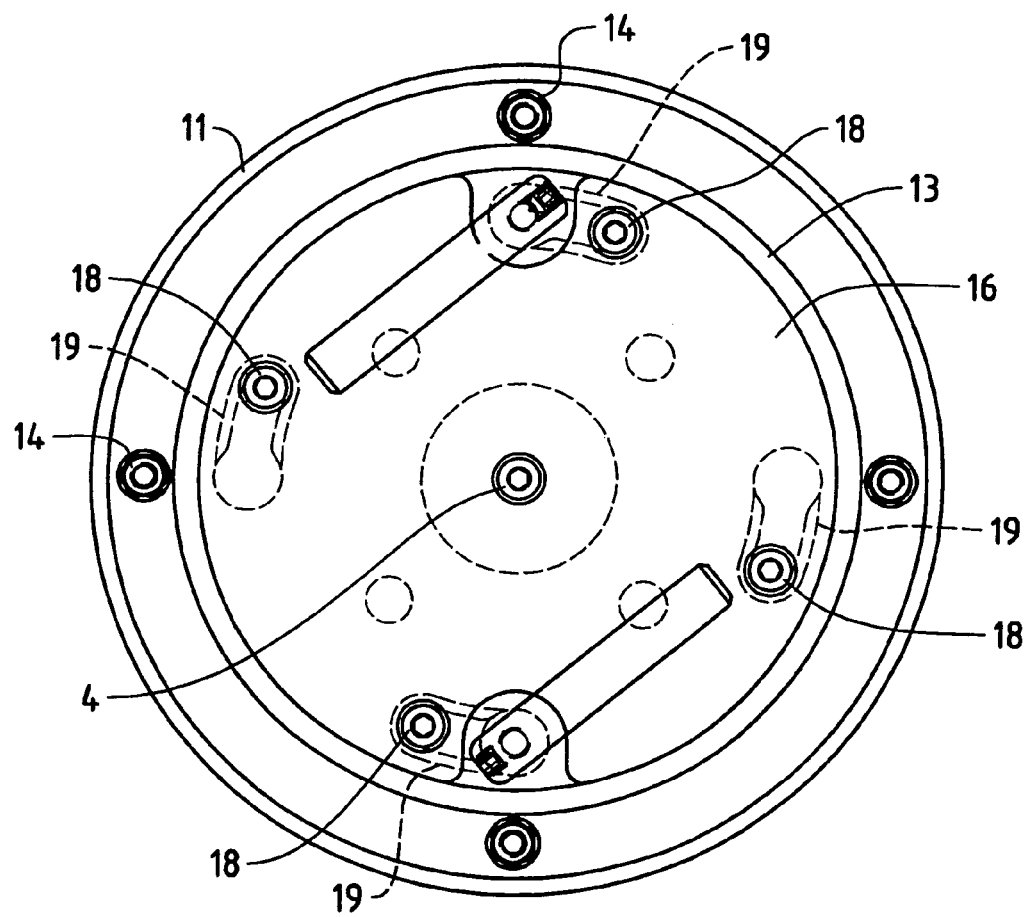
FIG. 2 is a view from above of the means of attachment of the auxiliary wheel, in attached state on the wheel of the vehicle, without wheel rim and tires of the respective wheels.

FIG. 2 shows a view from above of the spacer sleeve 13 and the plate 16 which are connected to the wheel rim 11 via the bolts 14. Fixed in the plate 16 are bolts 18, the axes of which are aligned parallel to the wheel axle 4. In the state where the auxiliary wheel is attached to the wheel of the vehicle, as shown in FIG. 2, these bolts 18 are inserted into slot-shaped recesses 19, and are held there, as will be described in detail later. These slot-shaped recesses 19 are provided in the further plate 9 which is covered by the plate 16 in FIG. 2.

Shown in FIGS. 3 to 6 are the design of the bolts 15, which are fixed to the plate 16, and the co-operation with the slot-shaped recesses 19, provided in the further plate 9 of the wheel of the vehicle. Each of the bolts 18 comprises a cylindrical shank 20 on which a head 21 is formed, which is likewise of cylindrical shape. The bolt shank 20 and the head 21 are fixed to the plate 16 of the auxiliary wheel via a bolt 22, as can be seen in FIGS. 5 and 6.

Provided in the further plate 9, which is connected to the wheel of the vehicle, are the slot-shaped recesses 19. One of these slot-shaped recesses 19 is shown in FIGS. 3 and 4. This slot-shaped recess 19 has at one end region an insertion zone 23 which is large enough for the head 21 of the bolt 18 to be able to move into the insertion zone. Remote from the insertion zone, the slot-shaped recess 19 is designed as a retaining zone provided with laterally running protruding pieces 25. As can be seen from FIG. 3, these protruding pieces 25 have a protruding piece thickness which increases from the insertion zone 23 toward the end of the retaining zone 24.

FIG. 5 shows the situation during attachment of the auxiliary wheel to the wheel of the vehicle in which the respective bolt 18 is inserted through the insertion zone 23 of the slot-shaped recess 19. Since the thickness of the protruding pieces 25 is less in this zone, there is play between the face 26, which is formed between the head 21 and the bolt shank 20, and which is conically inclined, and the supporting surfaces, which are likewise correspondingly inclined, of the protruding pieces 25. Through movement of the auxiliary wheel relative to the wheel of the vehicle, the bolt can be brought from this insertion position along the slot-shaped recess 19 into the retaining zone 24 at the end of the slot-shaped recess 19. Since the thickness of the protruding pieces 25 is larger here, no play exists anymore between the plate 16 of the auxiliary wheel and the further plate 9 of the wheel of the vehicle; the plate 16 thus abuts the further plate 9 without play.

The slot-shaped recesses 19 with the protruding pieces 25 are disposed such that the auxiliary wheel is additionally braced with respect to the wheel of the vehicle during forwards drive of the vehicle.

The faces 26 of the bolts 18 and the support surfaces of the protruding pieces 25 are designed beveled or respectively inclined, whereby a better fit of the bolt is achieved without axial play with respect to the support surfaces of the protruding pieces, in addition to facilitating insertion and displacement in the attached state.

As can be learned from FIG. 2 and FIG. 4, the slot-shaped recesses 19 are disposed circularly and centrosymmetrically about the wheel axle center 4. Thus, for attachment to the wheel of the vehicle, the auxiliary wheel can be put on in axial direction, the bolts 18 being inserted into the insertion zones 23 of the slot-shaped recesses 19, afterwards the wheel can be turned and the bolts can be inserted into the retaining zone 24 of the slot-shaped recesses 19, where they are held, as previously described. The wheel is kept in this position via the locking devices 17, as will be described in the following.

In the embodiment example shown here, four slot-shaped recesses 19 are disposed on the wheel of the vehicle distributed over the circumference, while four bolts 18 are correspondingly provided on the auxiliary wheel. Of course it would also be conceivable to select another number of slot-shaped recesses and bolts, depending upon the size of the wheels, preferably a minimum of two slot-shaped recesses with two corresponding bolts having to be provided.

Figure 7:
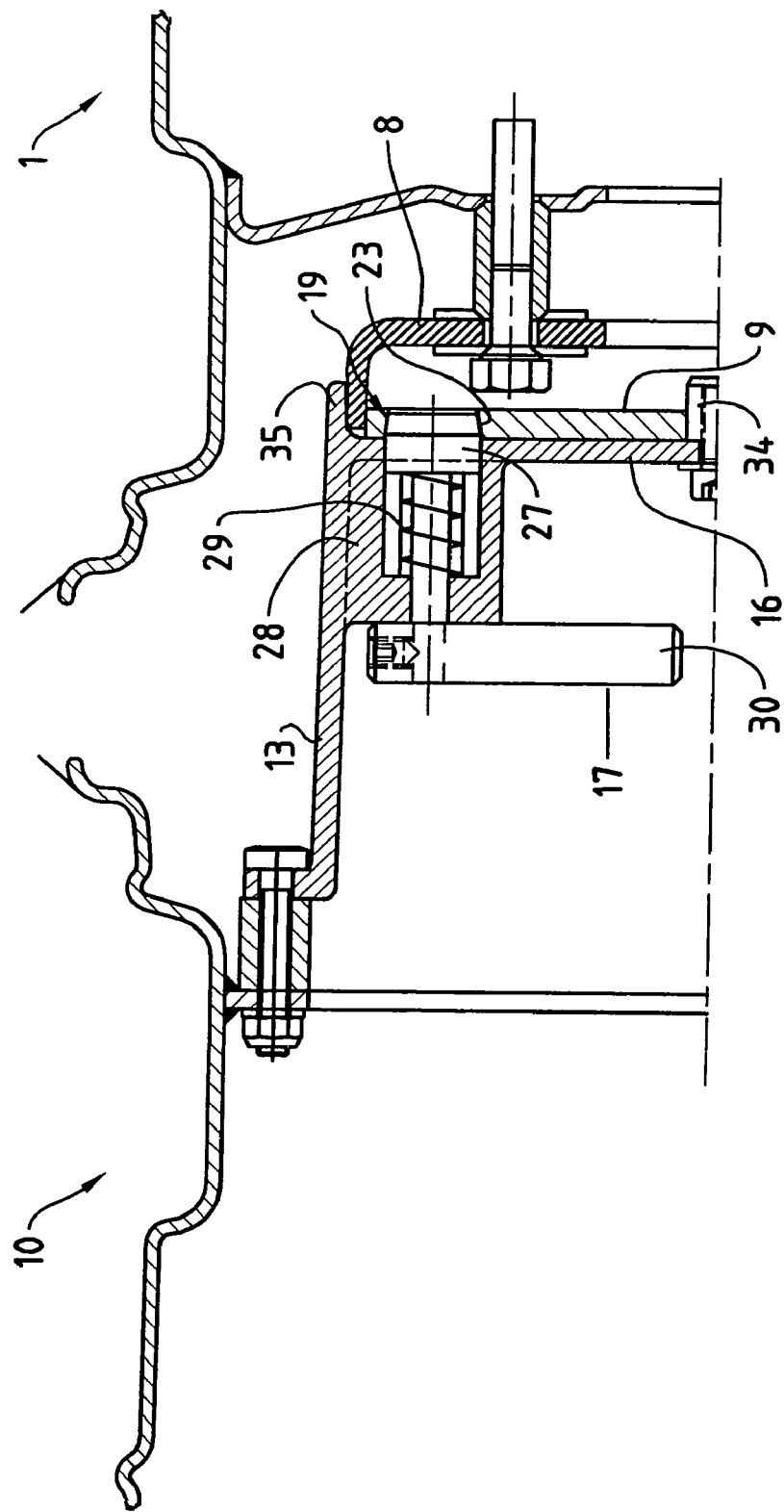
FIG. 7 is a sectional view of a locking means in the state of the auxiliary wheel put on and locked on the wheel of the vehicle.

Shown in FIG. 7 is a locking device 17. This locking device 17 consists of an axially displaceable locking bolt 27 which is borne in a guide bush 28 attached to the plate 16, provided on the auxiliary wheel 10, and to the spacer sleeve 13. This locking bolt 27 comprises a spring element 29 by means of which the locking bolt 27 is pushable in the direction of the locked state, as shown in FIG. 7.

As also can be seen from FIG. 2, the locking bolts 27 are disposed such that, in the state of the auxiliary wheel 10 being attached to the wheel 1 of the vehicle, in which the bolts 18 are in the retaining zones 24 of the slot-shaped recesses 19 (FIG. 4 and FIG. 6), the locking bolts 27 protrude into the insertion zone 23 of the slot-shaped recess 19 in the locked state. To facilitate the movement of the locking bolt 27 into the locked state, the end region of the locking bolt 27 has been designed to be conical. The receiving insertion zone 23 of the slot-shaped recess 19 is of corresponding shape. An optimal fit of the locking bolt 27 in the slot-shaped recess in the locked state is thereby also achieved.

The other end region of the locking bolt 27 protrudes beyond the guide bush 28. A cross bolt 30 is fixed to this protruding area. By means of this cross bolt 30, the locking bolt 27 is rotatable.

Figure 8:
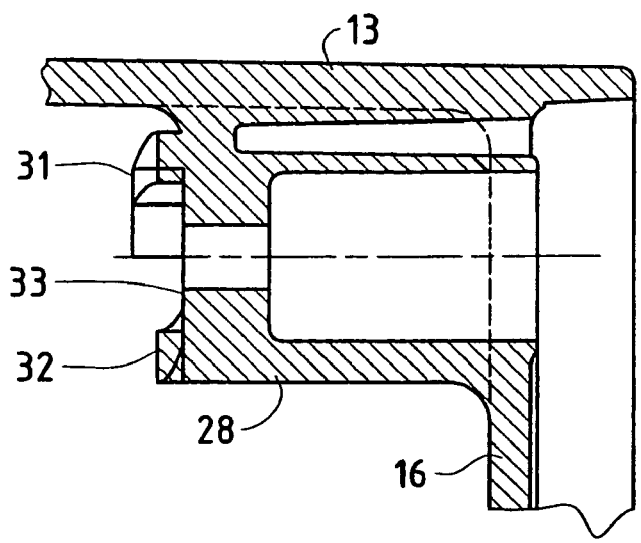
FIGS. 8 to 10 are views of the guide bush, which is disposed on the plate of the auxiliary wheel, and in which the locking bolts are insertable.
Figure 9:
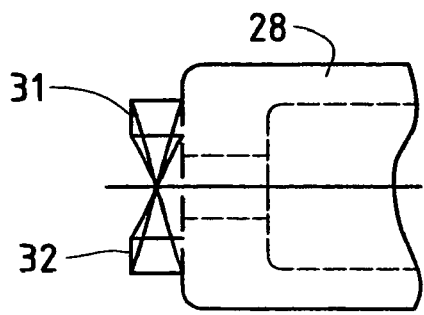
Figure 10:
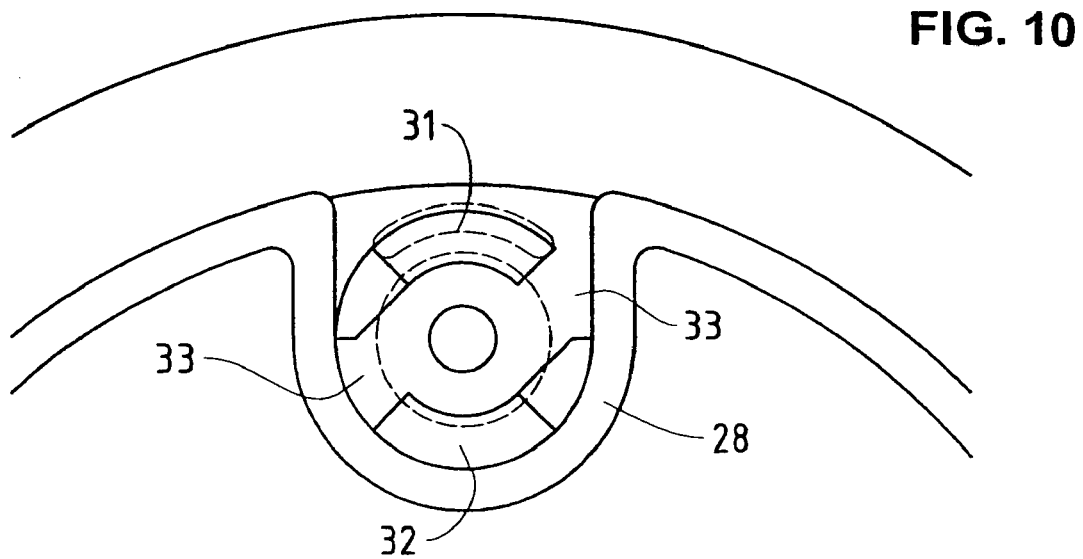

As can be seen from FIGS. 8 to 10, two cheeks 31, 32 are provided on the upper edge of the guide bush 28, on which cheeks the cross bolt 30 (FIG. 7) supports itself. The cheeks 31 and 32 have an incline in the rotational direction of the locking bolt 27. In locked state, the cross bolt 30 is situated between the two cheeks 31 and 32 in an empty space 33 (FIG. 10). The locking bolts are hereby in the locked state, as is shown in FIG. 7. To pull the locking bolt 27 out of the insertion zone 23 of the slot-shaped recess 19 (FIG. 7), the cross bolt can be turned; by means of the cheeks 31 and 32 having the incline, by means of which the cross bolt 30 is supported, the locking bolt 27 is pulled out of the insertion zone 23 of the slot-shaped recess 19, and the auxiliary wheel 10 is released to rotate.

As has already been mentioned, the slot-shaped recesses 19, provided on the further plate 9 of the wheel 1 of the vehicle, are disposed circularly and centrosymmetrically with respect to the wheel axle center. This makes it possible for the auxiliary wheel 10 to be able to be placed on the wheel 1 of the vehicle in axial direction and to be able to be turned about the wheel axle for fastening until the locking bolts engage in the respective apertures. To make the placement of the auxiliary wheel 10 on the wheel 1 of the vehicle easier, a central guide pin 34 is disposed on the plate 16 of the auxiliary wheel, which pin is insertable in a corresponding opening of the further plate 9 of the wheel 1 of the vehicle, as can be seen from FIG. 7. The spacer sleeve 13 of the auxiliary wheel 10 can be provided with a protrusion 35 in each case over the entire circumference or only regionally, which protrusion can be pushed over the outer circumference of the dish 8 of the wheel 1 of the vehicle, resulting in additional aid in guiding, and facilitating the mounting of the auxiliary wheel 10 on the wheel 1 of the vehicle.

In the present embodiment example, two locking devices are provided in the auxiliary wheel. Of course it is also possible to select a different number, depending upon the size of the wheels and depending upon the number of slot-shaped recesses. At least one locking device is necessary in any case.

With this inventive design of the attachment means, the auxiliary wheel is able to be attached to the wheel of a vehicle in the simplest way. The cross bolt 30 can be brought into a position such that the locking bolt 27 is brought automatically into the locked position via the spring element 29. To remove the auxiliary wheel, the cross bolts 30 have to be turned; the auxiliary wheel, for its part, can then be turned relative to the wheel of the vehicle until the bolts 18 are able to be moved out through the insertion zone 23.

A rack can be provided on the vehicle for taking along the auxiliary wheels, on which rack e.g. two plates each are fixed, each corresponding to the further plate 9 of the wheel of the vehicle. Provided in each of these plates are the corresponding slot-shaped recesses. The auxiliary wheels can then be attached in a simple way to this holding device and are available for use at all times.

The invention claimed is:

1. An attachment device for an auxiliary wheel, releasably attachable to a wheel of a vehicle, comprising a coupling part, provided on the auxiliary wheel, with coupling members held therein, and a holding part, provided on the wheel of the vehicle, with corresponding receiving parts for the coupling members, which coupling members are engaged and held in the receiving parts in the state of the auxiliary wheel being attached to the wheel of the vehicle, in which state the auxiliary wheel is aligned coaxially to the wheel of the vehicle, wherein the coupling members are designed as bolts, each of which is: aligned substantially parallel to the wheel axle of the auxiliary wheel, connected to the wheel rim of the auxiliary wheel, and has a head on the end region remote from the wheel rim, and wherein the receiving parts disposed on the holding part are slot-shaped recesses having: an insertion zone into which zone the heads of the respective bolts are insertable through displacement of the auxiliary wheel in wheel axle direction, and a retaining zone, with protruding pieces, into which zone the heads of the bolts are pushable through movement of the auxiliary wheel in the plane running substantially perpendicular to the wheel axle, are supportable on the protruding pieces and are maintainable in this position through locking means, the locking means each comprising an axially displaceable locking bolt which is borne in a guide bush, which guide bush is disposed on the plate provided on the auxiliary wheel in such a way that in the state of the auxiliary wheel being attached to the wheel of the vehicle the locking bolt is insertable with the one end region in the corresponding insertion zone of the slot-shaped recess, and makes impossible a movement of the auxiliary wheel with respect to the wheel of the vehicle in this locked state.

2. The attachment device according to claim 1, wherein the bolts are fixed to a plate which is connected to the wheel rim of the auxiliary wheel via a spacer sleeve, and the slot-shaped recesses are made in a further plate which is connected to the wheel rim of the wheel of the vehicle via spacers, and the plate and the further plate abut one another in the state of the auxiliary wheel being attached to the wheel of the vehicle.

3. The attachment device according to claim 1, wherein the protruding pieces, holding the heads of the bolts, of the slot-shaped recesses each have a protruding piece thickness that increases from the respective insertion zone toward the end remote from the insertion zone, and the support surfaces of the protruding pieces for the heads of the bolts increase from the insertion zone.

4. The attachment device according to claim 1, wherein the slot-shaped recesses co-operating with the respective bolts are disposed circularly and centrosymmetrically about the wheel axle center.

5. The attachment device according to claim 4, wherein the auxiliary wheel is provided with guide and centering means which co-operate with corresponding guide surfaces provided on the wheel of the vehicle and by means of which the auxiliary wheel is led in axial direction and is able to be centered during the displacement, for attaching to the wheel of the vehicle.

6. The attachment device according to claim 1, wherein the shank of the bolt and the head of the bolt are cylindrical, the face between head and bolt shank is conically inclined, and the support surfaces of the protruding pieces are correspondingly beveled.

7. The attachment device according to claim 1, wherein the end region of the locking bolt insertable into the insertion zone is of conical design, and the insertion zone of the slot-shaped recess is correspondingly conically shaped.

8. The attachment device according to claim 1, wherein the other end region of the locking bolt protrudes beyond the guide bush, and a cross bolt is fixed on this protruding area, by means of which the locking bolt is rotatable, and wherein this cross bolt is supported on cheeks provided on the upper edge of the guide bush, which cheeks have an incline in the rotational direction of the locking bolt.

9. The attachment device according to claim 1, wherein disposed in the guide bush is a spring element by means of which the locking bolt is pushable in the direction of the locked state.

* * * * *

UNITED STATES PATENT AND TRADEMARK OFFICE
CERTIFICATE OF CORRECTION

PATENT NO.         : 7,040,713 B2
APPLICATION NO.    : 10/721120
DATED              : May 9, 2006
INVENTOR(S)        : Schaad, Rudolf and Schaad, Fritz Johann It is certified that error appears in the above-identified patent and that said Letters Patent is hereby corrected as shown below:

On the Title Page, the inventors should be listed as follows:

--(12) UNITED STATES PATENT
      Schaad et al.

(75)   Inventors: Rudolf Schaad, Deitingen (CH)
                    Fritz Johann Schaad, Subingen (CH)--;

Column 3, line 66
"bolts 15" should be --bolts 18--.

Signed and Sealed this

Fifth Day of September, 2006

JON W. DUDAS
*Director of the United States Patent and Trademark Office*